United States Patent
Shang et al.

(10) Patent No.: US 11,603,209 B2
(45) Date of Patent: Mar. 14, 2023

(54) AVIATION HYDRAULIC PROPULSION SYSTEM UTILIZING SECONDARY CONTROLLED DRIVES

(71) Applicant: Purdue Research Foundation, West Lafayette, IN (US)

(72) Inventors: Lizhi Shang, West Lafayette, IN (US); Monika Ivantysynova, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 301 days.

(21) Appl. No.: 16/755,527

(22) PCT Filed: Oct. 8, 2018

(86) PCT No.: PCT/US2018/054892
§ 371 (c)(1),
(2) Date: Apr. 10, 2020

(87) PCT Pub. No.: WO2019/074860
PCT Pub. Date: Apr. 18, 2019

(65) Prior Publication Data
US 2020/0307811 A1 Oct. 1, 2020

Related U.S. Application Data

(60) Provisional application No. 62/571,192, filed on Oct. 11, 2017, provisional application No. 62/571,183, filed on Oct. 11, 2017.

(51) Int. Cl.
*B64D 27/02* (2006.01)
*B64D 27/10* (2006.01)
(Continued)

(52) U.S. Cl.
CPC .......... *B64D 27/02* (2013.01); *B64C 29/0025* (2013.01); *B64D 27/10* (2013.01);
(Continued)

(58) Field of Classification Search
CPC ........ B64D 27/02; B64D 27/10; B64D 27/24; B64D 31/02; B64D 31/04; B64D 31/06;
(Continued)

(56) References Cited

U.S. PATENT DOCUMENTS

| 2,427,982 A | 9/1947 | Trotter |
| 3,253,806 A | 5/1966 | Eickmann |

(Continued)

OTHER PUBLICATIONS

Berg et al., Design and testing of a robust linear controller for secondary controlled hydraulic drive, 1999, Proc Instn Mech Engrs, vol. 213 Part I.
(Continued)

*Primary Examiner* — Brady W Frazier
(74) *Attorney, Agent, or Firm* — Piroozi-IP, LLC

(57) ABSTRACT

A hydraulic propulsion system is disclosed which includes an input interface configured to receive mechanical power from a power source, a pressure source comprising one or more fixed or variable displacement pumps coupled to the input interface and adaptable to convert mechanical power to hydraulic power and controlling outlet pressure of the pressure source (system pressure), one or more variable displacement motors coupled to the pressure source via a corresponding high-pressure line configured to be mechanically coupled to one or more aerodynamic rotors of an aircraft and comprising a closed loop speed control arrangement in response to a commanded rotor speed, and a
(Continued)

controller configured to control the speed of one or more variable displacement motors by providing a control signal for controlling the system pressure.

22 Claims, 9 Drawing Sheets

(51) Int. Cl.
  *B64D 27/24* (2006.01)
  *B64D 31/02* (2006.01)
  *B64D 33/08* (2006.01)
  *B64D 35/04* (2006.01)
  *F15B 11/17* (2006.01)
  *B64D 31/04* (2006.01)
  *B64D 31/06* (2006.01)
  *B64D 31/14* (2006.01)
  *B64C 29/00* (2006.01)

(52) U.S. Cl.
  CPC ............. *B64D 27/24* (2013.01); *B64D 31/02* (2013.01); *B64D 31/04* (2013.01); *B64D 31/06* (2013.01); *B64D 31/14* (2013.01); *B64D 33/08* (2013.01); *B64D 35/04* (2013.01); *F15B 11/17* (2013.01); *B64D 2027/026* (2013.01)

(58) Field of Classification Search
  CPC ........ B64D 31/14; B64D 33/08; B64D 35/04; B64D 2027/026; B64C 29/0025; F15B 11/17
  USPC ......................................................... 60/420
  See application file for complete search history.

(56) References Cited

U.S. PATENT DOCUMENTS

| | | |
|---|---|---|
| 3,253,807 A | 5/1966 | Eickmann |
| 3,497,162 A | 2/1970 | Eickmann |
| 4,399,886 A | 8/1983 | Pollman |
| 4,571,157 A | 2/1986 | Eickmann |
| 4,856,732 A | 8/1989 | Eickmann |
| 5,122,036 A | 6/1992 | Dickes et al. |
| 5,865,602 A | 2/1999 | Nozari |
| 5,890,441 A | 4/1999 | Swinson et al. |
| 6,044,924 A | 4/2000 | Adli |
| 7,201,095 B2 | 4/2007 | Hughey |
| 7,356,992 B2 | 4/2008 | Ivantysynova et al. |
| 8,191,290 B2 | 6/2012 | Hughes, Iv et al. |
| 8,955,797 B2 | 2/2015 | Buono et al. |
| 9,671,009 B2 | 6/2017 | Nystrom et al. |
| 10,131,426 B2 | 11/2018 | Judas et al. |
| 10,435,169 B2 | 10/2019 | Steinwandel et al. |
| 2002/0033420 A1* | 3/2002 | Paarporn ............. F04D 15/0066 236/36 |
| 2006/0145482 A1 | 7/2006 | Roethler et al. |
| 2010/0258196 A1* | 10/2010 | Melcer .................... F04B 23/04 417/253 |
| 2013/0183169 A1 | 7/2013 | Buono et al. |
| 2013/0227939 A1* | 9/2013 | Hornberg ................ F15B 11/16 60/420 |
| 2018/0215462 A1* | 8/2018 | Fenny .................... B64C 27/08 |

OTHER PUBLICATIONS

ISR of PCT/US/1854892, Jan. 8, 2019.

* cited by examiner

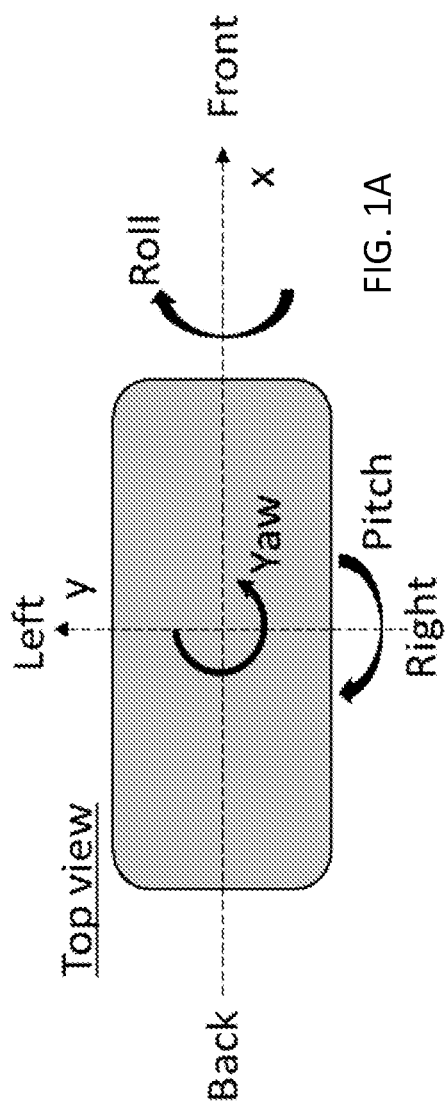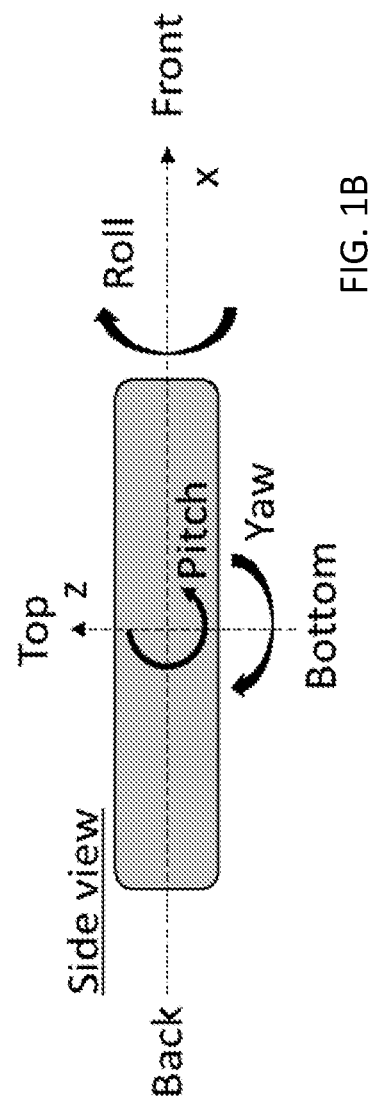

AVIATION HYDRAULIC PROPULSION SYSTEM UTILIZING SECONDARY CONTROLLED DRIVES

CROSS-REFERENCE TO RELATED APPLICATIONS

The present patent application is a 35 U.S.C. § 371 Nationalization Application of and claims the priority benefit of the International Patent Application Serial No. PCT/US18/54892 filed Oct. 8, 2018, which is related to and claims the priority benefit of U.S. Provisional Patent Application Ser. No. 62/571,183 filed Oct. 11, 2017, U.S. Provisional Patent Application Ser. No. 62/571,192 filed Oct. 11, 2017, and a counterpart International Patent Application Serial No. PCT/US18/54890 filed Oct. 8, 2018, having the title Displacement Control Hydrostatic Propulsion System for Multi-Rotor Vertical Take Off and Landing Aircraft, the contents of each of which are hereby incorporated by reference in their entirety into the present disclosure.

TECHNICAL FIELD

The present disclosure relates to a hydraulic propulsion system for rotary-wing and fixed wing aircrafts.

BACKGROUND

This section introduces aspects that may help facilitate a better understanding of the disclosure. Accordingly, these statements are to be read in this light and are not to be understood as admissions about what is or is not prior art.

On most aircrafts, thrust is generated according to Newton's third law of action and reaction. The working fluid which in most cases is air, is accelerated by the propulsion system, and the reaction of this acceleration produces the thrust. The propulsion system is found more efficient to accelerate a large mass by a small amount. Therefore, propeller propulsion system and high bypass ratio turbofan engine are usually more efficient than the low bypass ratio turbofan engine and turbojet engine. However, further improvement on the aircraft propulsion system efficiency is difficult due to the fact that the aerodynamic rotors such as the propeller and the fan are favored based on low speed and the power sources such as an internal combustion engine and the core of the turbine engine are favored based on high speed since, for the same thrust, the larger aerodynamic rotor operating at lower speed is more efficient than the smaller rotor operating at higher speed. Also, controlling the tip speed below the speed of the sound also significantly improves the efficiency and reduces noise. On the other hand, for the same power, the engine operates at higher speed can be made smaller and lighter. A gearbox was commonly used as a reducer between the engine (in most cases the engine is a turbine engine) and the propeller. PRATT & WHITNEY'S geared turbofan engine uses the planetary gearbox to connect the fan and the turbine core. However, a gearbox with a fixed gear ratio is only able to reduce the rotational speed from the power source to the aerodynamic rotor. In order to allow both the rotor and the engine operate at their optimal speed, the propulsion system that is able to individually control both rotational speeds is necessary.

For achieving higher aerodynamic efficiency, thrust of the aircraft is preferred to be located along the airfoil. The conceptual aircraft designs that are under investigation include NASA's N3-X turbo-electric superconducting airplane which uses 14 motor driven fans at the aft of the vehicle to produce thrust while re-energizing the aft boundary layer to improve efficiency, and NASA/EMPIRICAL SYSTEMS AEROSPACE, INC.'s ECO-150 which is also an example of a turbo-electric architecture which uses electrically driven fans along the wing in a split-wing to improve the wing and propulsion system performance. Both of the conceptual aircraft designs require the thrust be provided at the location that is not possible for the conventional propulsion system.

The conventional fixed-wing aircraft use control surfaces (such as elevators, rudders, ailerons, flaps, and spoilers) to control the aircraft attitude. For most of the aircraft design, the control surfaces do not contribute to the lift but increase the drag of the aircraft. For more efficient airplane design, the propulsion which allows differential thrust and thrust vectoring can be used to control the aircraft, therefore, eliminates the control surfaces and the drag associate with them. One example is NASA's N3-X aircraft which rely on the differential thrust only for its yaw control authority. The differential thrust requires the aerodynamic rotor speed to be controlled independently and responsively. Additionally, thrust vectoring requires the ability to easily change the direction of the aerodynamic rotor axis.

Fast vertical takeoff and landing aircraft also requires thrust vectoring to point the propulsion force downward or takeoff and landing and the backward for efficient high speed cruise. One example is AURORA's XV-24A LightningStrike hybrid-electric aircraft.

Two important limitations associated with these aircrafts include weight and ability to independently control each rotor in a multi-rotor aircraft. Various propulsion systems are used, such as electrical, mechanical, and electromechanical. However, each suffer from excessive weight and/or lack of responsiveness limiting their utility. In particular, in order to dynamically control each rotor independently so that a desired attitude can be achieved for the aircraft, a number of complicated devices are typically used which are both heavy and require constant maintenance.

Therefore, there is an unmet need for a novel approach for propulsion rotary-wing and fixed wing aircrafts.

SUMMARY

A hydraulic propulsion system is disclosed. The system includes an input interface configured to receive mechanical power from a power source. The system further includes a pressure source comprising one or more fixed or variable displacement pumps coupled to the input interface and adaptable to convert mechanical power to hydraulic power and controlling outlet pressure of the pressure source (system pressure). In addition the system include one or more variable displacement motors coupled to the pressure source via a corresponding high-pressure line configured to be mechanically coupled to one or more aerodynamic rotors of an aircraft and comprising a closed loop speed control arrangement in response to a commanded rotor speed. Furthermore, the system includes a controller configured to control the speed of one or more variable displacement motors by providing a control signal for controlling the system pressure.

In the disclosed system the power source is one or more internal combustion engines.

In the disclosed system the power source is one or more electric motors.

In the disclosed system the power source is one or more turbine engines.

In the disclosed system the system pressure is set constant.

In the disclosed system the system pressure is set using one of an associated electro-hydraulic displacement control device, hydro-mechanical displacement control device, electro-mechanical displacement control device, and a combination thereof.

In the disclosed system the speed of the variable displacement motors is controlled by a closed loop speed control utilizing a speed sensing device for measuring rotor speed and one of an associated electro-hydraulic displacement control device, mechanical displacement control device, electro-mechanical displacement control device, and a combination thereof.

In the disclosed system a system pressure command for the system pressure of the pressure source is generated by one of a flight control computer, a pilot, and a combination thereof.

In the disclosed system the motor speed control input is provided by one of a flight control computer, a pilot, and a combination thereof.

In the disclosed system the controller is further configured to receive signals corresponding to one or more of position, attitude, and motion of the aircraft and to generate system pressure using a feedback control system strategy based on a desired attitude and the actual attitude.

The disclosed system the further includes a fluid cooling device adapted to cool fluid used therein.

In the disclosed system the controller further is configured to receive a signal corresponding to the speed of each motor and to provide the speed information as speed feedback signals to the flight control computer.

The disclosed system further includes a closed-loop control arrangement using the speed feedback signals.

The disclosed system is further configured to receive a signal corresponding to the displacement of each motor and to provide the displacement information as displacement feedback signals to the flight control computer.

The disclosed system further includes a closed-loop control arrangement using the displacement feedback signals.

In the disclosed system the variable displacement pumps are coupled to each other in series manner, whereby flow of fluid through each of the pumps is substantially equal and whereby pressure across each of the pumps is additive to establish the system pressure.

In the disclosed system the variable displacement pumps are coupled in pairs in a parallel manner, whereby pressure across each of the pumps is substantially the same, and the fluid flow through the pumps is additive.

In the disclosed system each pump is coupled to a dedicated power source.

In the disclosed system each pump is coupled to the one or more input interfaces.

In the disclosed system the one or more input interfaces is a gearbox.

In the disclosed system each pump is coupled to a dedicated power source.

In the disclosed system the system pressure is controlled by a controllable pressure relief valve coupled to the pumps.

In the disclosed system the fluid is a compressible fluid.

In the disclosed system the compressible fluid is air.

In the disclosed system the fluid is an incompressible fluid.

In the disclosed system the system the incompressible fluid is one of hydraulic oil, water, fuel, antifreeze, and a combination thereof.

BRIEF DESCRIPTION OF DRAWINGS

FIGS. 1A and 1B are schematic representations of directional movements of an aircraft from a top view (FIG. 1A) and a side view (FIG. 1B).

DETAILED DESCRIPTION

Figure 1C:
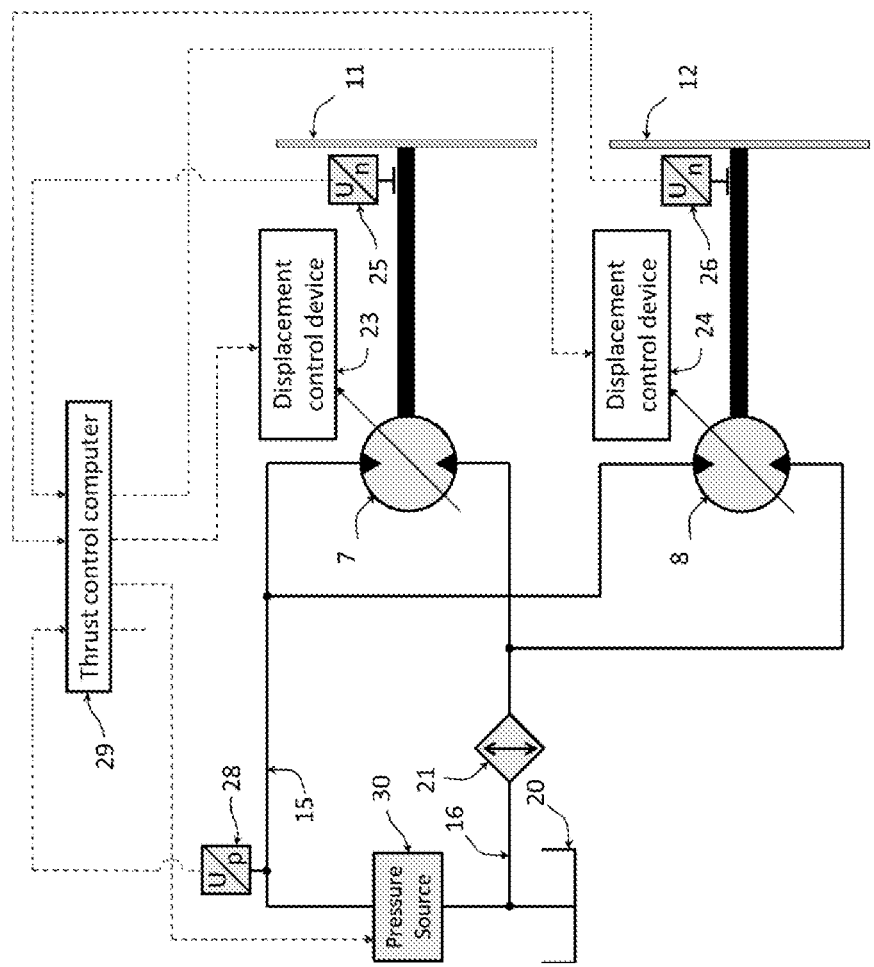
FIG. 1C is a schematic of an embodiment of a hydraulic propulsion system according to the present disclosure including a pressure source.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

In the present disclosure, the term "about" can allow for a degree of variability in a value or range, for example, within 10%, within 5%, or within 1% of a stated value or of a stated limit of a range.

In the present disclosure, the term "substantially" can allow for a degree of variability in a value or range, for example, within 90%, within 95%, or within 99% of a stated value or of a stated limit of a range.

The propulsion system of the present disclosure includes a control mechanism which is configured to transmit and distribute power and torque from a power source (e.g., one or more internal combustion engines) to single or multiple rotors, while controlling each rotor speed. The propulsion system according to the present disclosure can be used to control the different speeds of one or more rotors to achieve partial or full control authority in pitch, roll, and yaw directions as shown in FIGS. 1A and 1B. The thrust generated from the aerodynamic rotors is also used to overcome gravity and drag and to control the attitude of the aircraft. In FIGS. 1A and 1B, schematics of a top view and side view, respectively, of the aircraft is shown. Yaw is defined as the rotational movement about a z-axis that passes vertically through the center of the aircraft. Roll is defined as the rotational movement about an x-axis that passes horizontally through the center of the aircraft. Pitch is defined as the rotational movement about a y-axis that passes horizontally through the center of the aircraft.

To control rotor speed, the propulsion system of the present disclosure allows the engine(s) to operate at the optimized speed for a desired output power. Secondary controlled drive units utilize a controlled supply pressure to control the speed of the secondary controlled variable hydraulic motors through controlling the motor displacement and therefore the speed of the driven aerodynamic rotors.

The present disclosure is related to a counterpart application to be filed the same day as the present disclosure having the title Displacement Control Hydrostatic Propulsion System for Multi-Rotor Vertical Take Off and Landing Aircraft. The difference between the present disclosure and this counterpart application lies in control strategies. In the present disclosure the control system is based on a secondary control hydraulic propulsion system which controls the output (i.e., speed of the propellers) by changing the motor displacement. As such, the pumps can be fixed displacement or variable displacement. In case of using fixed displacement pump, the system pressure is adjusted by utilizing a valve network. In case of using variable displacement pump, the pump displacement changes to adjust the system pressure. In the secondary control hydraulic propulsion system, the bandwidth of the thrust is substantially determined by the bandwidth of the motor. In case of multiple motors, each motor speed can be controlled independently. Therefore, in order to control, e.g., 4 propeller speeds independently, at least one pump and four motors are required for the secondary control hydraulic propulsion system. In contrast, the disclosure found in the counterpart application is based on primary or displacement control in which the hydraulic propulsion system controls the rotational speed of the hydraulic motor by changing the pump displacement. As such, the motors can be fixed displacement or variable displacement. In case of using variable displacement motor, the motor displacement changes only to assist the pump to achieve improved overall performance. In the displacement control hydraulic propulsion system of the present disclosure, the bandwidth of the thrust is substantially determined by the bandwidth of the pump. Thus, according to the counterpart disclosure, in order to control four propeller speeds independently, at least 4 pumps and 4 motors are required for the displacement control hydraulic propulsion system.

Figure 1E:
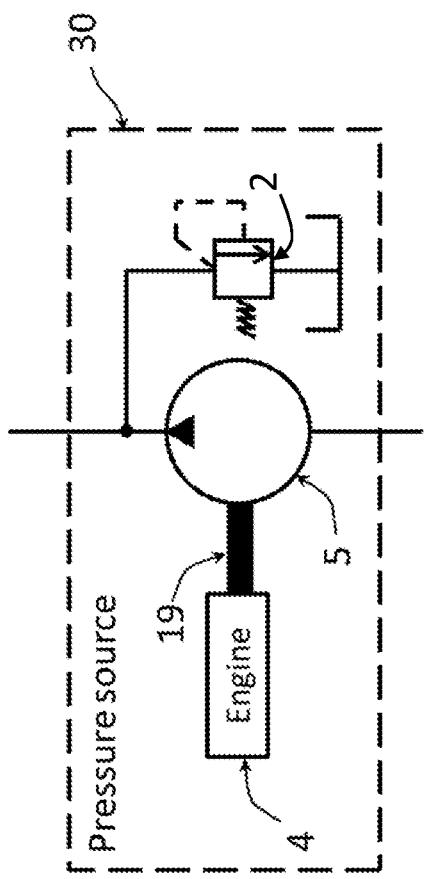
FIG. 1E is a schematic of another embodiment of the pressure source of FIG. 1C according to the present disclosure.
Figure 1D:
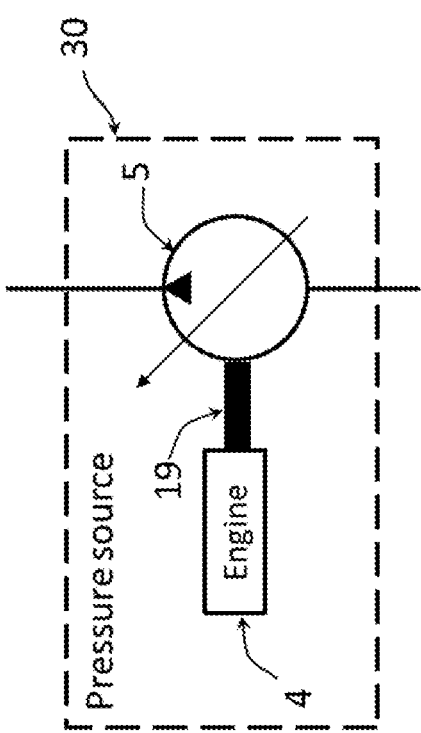
FIG. 1D is a schematic of an embodiment of the pressure source of FIG. 1C according to the present disclosure.

An example of a propulsion system 100 according to the present disclosure is shown in FIG. 1C. The propulsion system 100 includes a pressure source 30, motors 7, and 8 (two motors 7 and 8 are shown, however, the number of motors can be higher or lower based on the number of propellers, as further discussed below), a pressure sensor 28 coupled to the pressure source and configured to provide pressure readings, an optional cooling device 21, a low-pressure accumulator (not shown) or a pressurized reservoir 20 coupled to the pressure source 30, displacement control devices 23 and 24 (described below) each coupled to a corresponding motor 7 and 8, respectively, speed sensors 25,26 coupled to a corresponding motor 7 and 8, respectively, and rotors 11, 12 coupled to a corresponding motor 7 and 8, respectively. In addition, a thrust control computer 29 is also shown which is coupled to the pressure source 30, the pressure sensor 28, the displacement control devices 23,24, and the speed sensors 25,26. The pressure source 30 in FIG. 1C comprises a pressure compensated pump (as shown in FIG. 1D) where a set pressure is controlled hydraulically or electro-hydraulically, by operation of an engine 4 and the pump 5 and via driveshaft (or other input interface known to a person having ordinary skill in the art) 19. According to one embodiment of the present disclosure, a fixed displacement pump can be used with a pressure relief valve 2 which can be preset or adjusted according to the control signal to control the pressure level of the supply pressure of secondary controlled motors as shown in FIG. 1E. With the controllable line pressure, for the same amount of output power, the engine speed and torque can be controlled at an optimized point depending on the engine characteristic. Additionally, by utilizing a hydraulic accumulator (not shown), the propulsion system 100 of the present disclosure can store energy and reuse the stored energy to provide extra thrust when needed, as shown in FIG. 2, described further below.

Figure 1G:
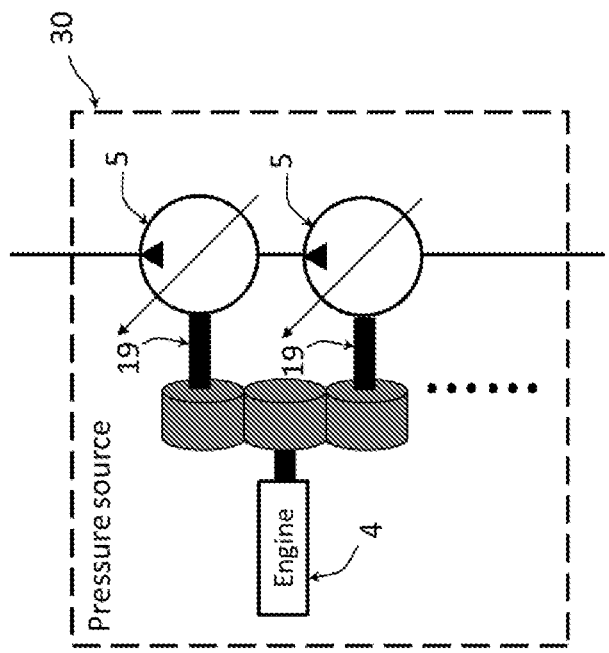
FIG. 1G is a schematic of another embodiment of the pressure source of FIG. 1C according to the present disclosure.
Figure 1F:
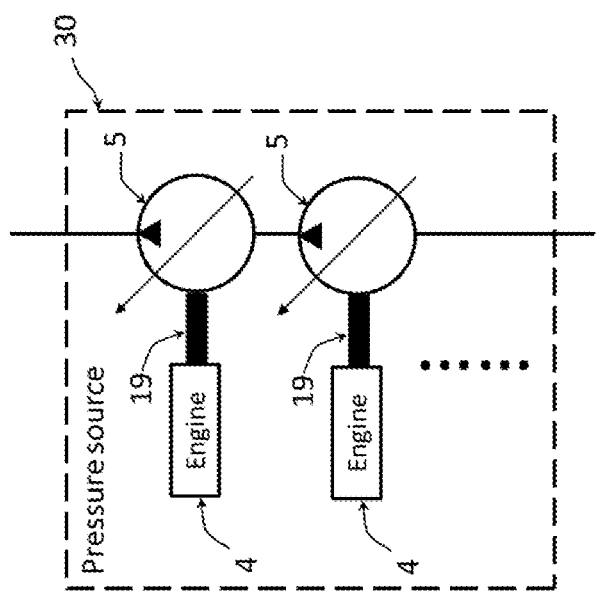
FIG. 1F is a schematic of another embodiment of the pressure source of FIG. 1C according to the present disclosure.
Figure 1I:
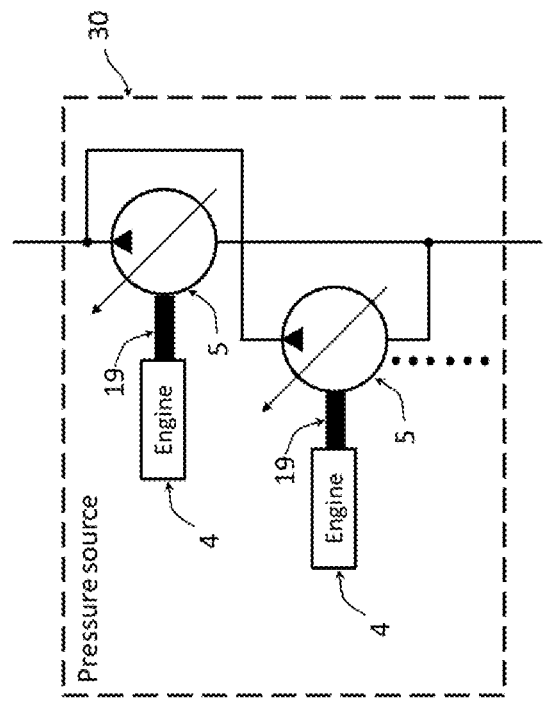
FIG. 1I is a schematic of another embodiment of the pressure source of FIG. 1C according to the present disclosure.
Figure 1H:
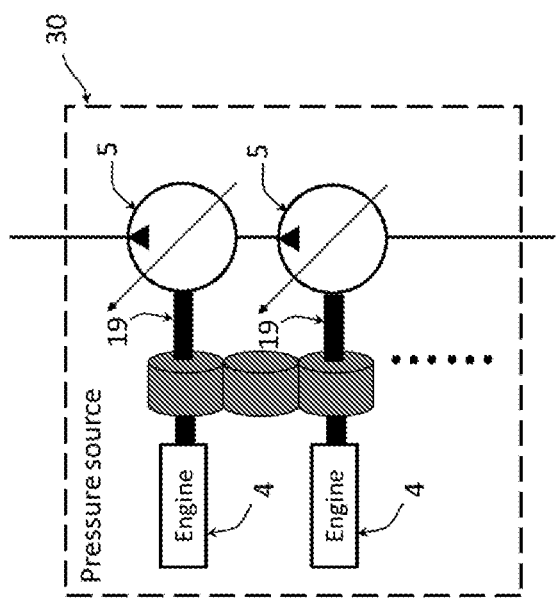
FIG. 1H is a schematic of another embodiment of the pressure source of FIG. 1C according to the present disclosure.

The propulsion system 100 shown in FIG. 1C, according to the present disclosure, utilizes at least one pressure source 30 to control the system pressure and to distribute and transmit mechanical power from a power source (e.g., single or multiple internal combustion engines, or turbine engines, or electric motors) to the secondary controlled motors 7,8 driving and controlling the speed of the rotors 11, 12 (which can be single or multiple propellers, fans, or compressors). While only one pump 5 is shown in FIG. 1D, in other embodiments of the present disclosure, the pressure source 30 comprises multiple pumps in a series manner as shown in FIG. 1F, where the multiple pumps 5 are driven by multiple engines 4 independently, each via a corresponding driveshaft 19. The pressure difference across the pressure source 30 is the sum of the pressure differences across each of the pumps 5 and the flow is substantially the same through each of the pumps 5. In other embodiments, the pumps 5 are coupled by gearbox via by one or more driveshafts 19 or similar manner and driven by single or multiple engines as shown in FIG. 1G and FIG. 1H, respectively. In other embodiments, as shown as FIG. 1I, the multiple pumps 5 can be arranged in a parallel manner, the pressure difference across each pump is the same as well as the pressure difference across the pressure source 30, while the flow provided from the pressure source 30 is the sum of each pump. In other embodiments, the multiple pumps can be driven by single or multiple engines as arranged in FIGS. 1G and 1H. The rotor speed is controlled by the displacement of the variable displacement motors 7,8 controlled by the measured rotor speed from sensors 25,26 and a closed loop control system described further below with reference to FIG. 5. The displacement of the secondary controlled motors 7,8 are controlled by a controller arrangement including electrical, mechanical, electromechanical, hydraulic, electrohydraulic, mechanical-hydraulic actuators, by human power through appropriate linkages, or any combination thereof, further described below.

Figure 2:
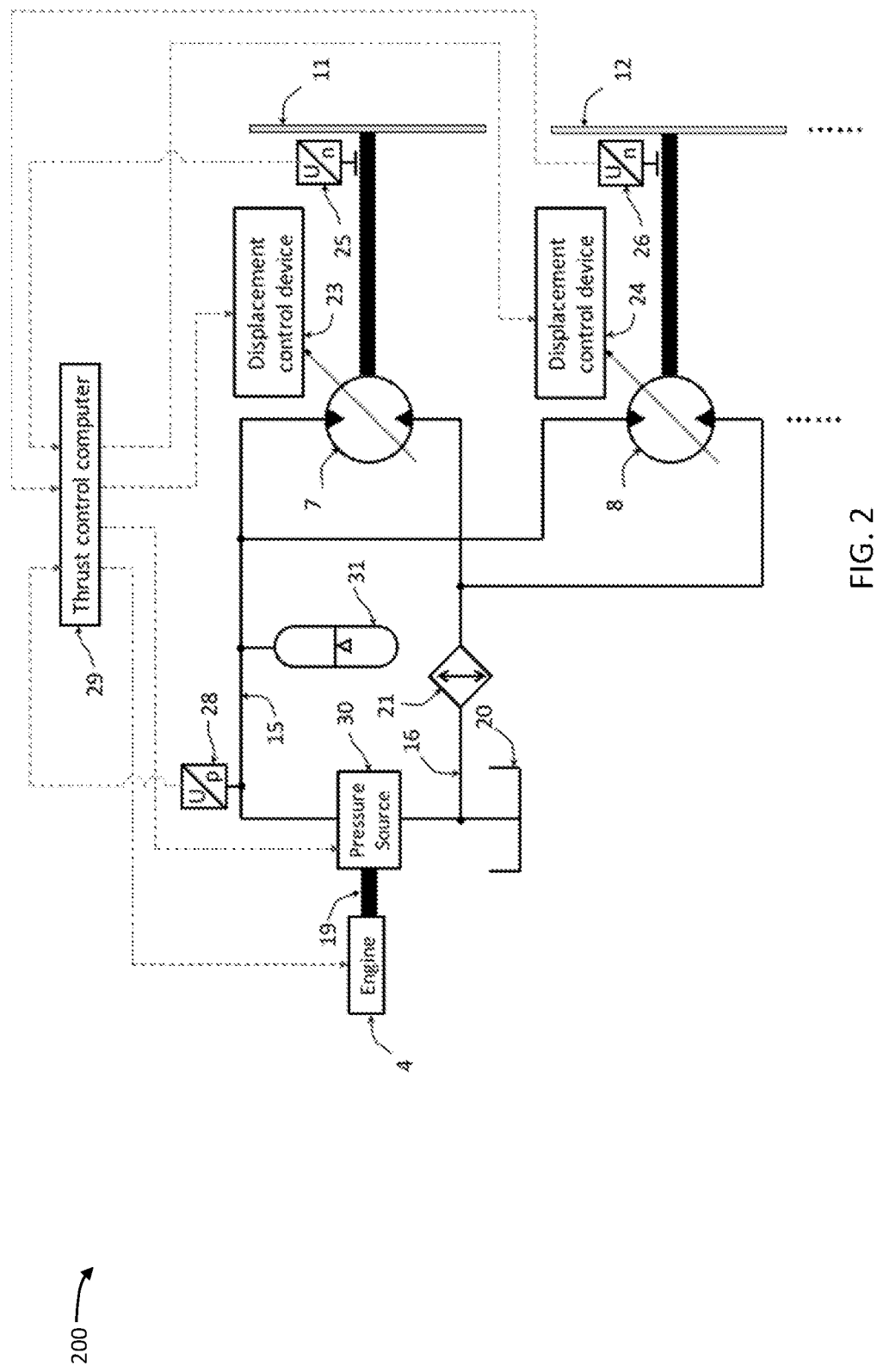
FIG. 2 is a schematic of a propulsion control system according to the present disclosure which can be used in conjunction with one or more of the embodiments disclosed herein.

Referring to FIG. 2, another embodiment of a propulsion system 200 according to the present disclosure is provided, which uses a high-pressure accumulator 31 fluidly coupled to the high-pressure line and a low-pressure accumulator (not shown) or a pressurized reservoir 20 fluidly coupled to the low-pressure line. The high-pressure accumulator 31 is used as energy storage. The stored high-pressure fluid can be selectively used as an additional power source at a certain phase of flight, through pressure control of the high-pressure line or through separating the high-pressure accumulator from the high-pressure line using a valve network (not shown). The accumulator 31 is partially filled with fluid and gas, and the energy is stored by pressurizing the gas within the accumulator.

Each fixed or variable displacement pump and variable displacement motor can be a positive displacement machine such as an axial, radial piston, gear or vane-type machine, or combinations thereof which generally comprise an array of displacement elements arranged radial or axial to the driveshaft. For example, in axial piston machines, one or more piston-cylinder combinations are arranged axially in a cylinder block. An example is shown in US publication 20120079936 for Ivantysynova et al., incorporated by reference herein in its entirety. For example, by linear movement of a piston within a cylinder, the piston which is coupled to a swash plate controls the swash plate angle which controls the output flow of the variable displacement pump which can in turn control the speed of the fixed displacement motor, to thereby control the speed of the aerodynamic rotor driven by the fixed displacement motor. By adjusting the inclination of the swash plate to a vertical position, the displacement of the pump/motor can be decreased to about zero. The angle of the swash plate can be controlled by electrical, mechanical, electromechanical, hydraulic, electrohydraulic, mechanical-hydraulic actuators, or by human power though appropriate linkages, or any combination thereof. By adjusting the swash plate inclination independently and separately, the variable displacement pump can be configured to communicate different system pressure levels, whereas the adjusting the swash plate of a variable displacement motor can be used to control the motor torque for a given system pressure and further to control the motor speed utilizing a closed loop speed control based on measured motor shaft or rotor speed.

Figure 3:
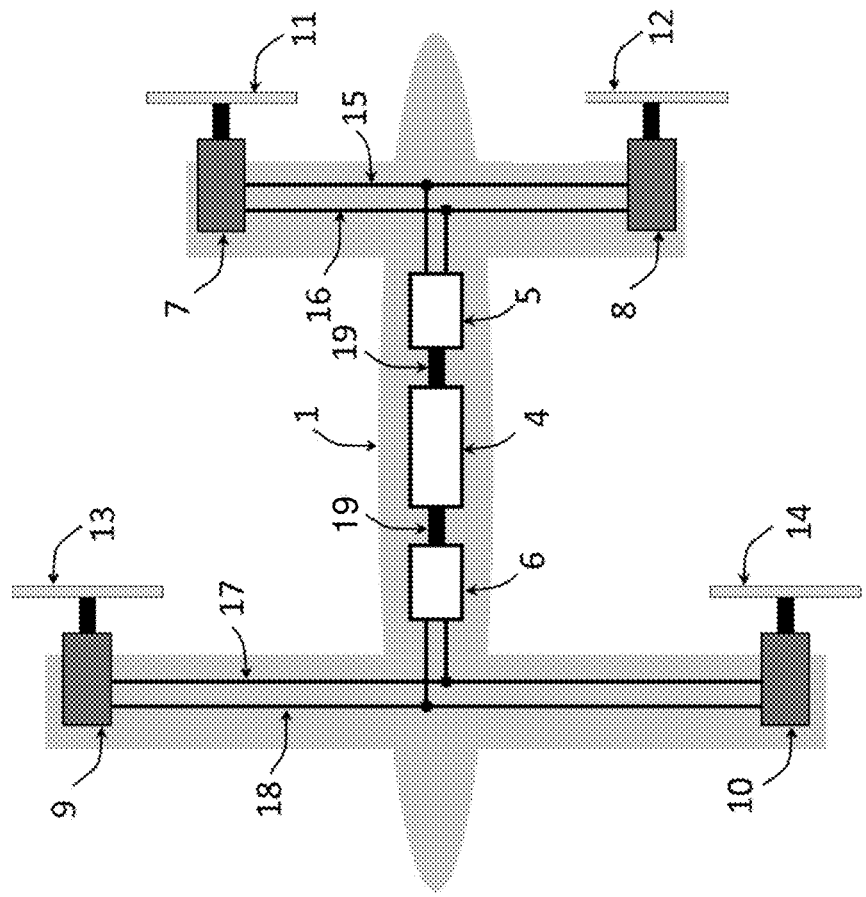
FIG. 3 is a top view of an aircraft showing the propulsion system according to the present disclosure deployed therein.

Referring to FIG. 3, a schematic of an embodiment of a propulsion system 300 is shown comprising two pumps 5, 6 and four motors 7, 8, 9, 10 are shown. The aviation hydraulic propulsion system according to this embodiment, includes a bay 1 which houses one or multiple engines 4, which drive one or multiple fixed or variable displacement pumps 5 and 6, each is fluidly coupled to at least one variable displacement motor 7, 8, 9, 10 in a parallel arrangement (e.g., motors 7 and 8 are coupled to the pump 5 in parallel and motors 9 and 10 are coupled to the pump 6 in parallel) via the hydraulic lines 15, 16, 17, and 18. Motors 7, 8, 9, 10 are coupled and drive rotors 11, 12, 13, and 14, respectively.

Figure 4:
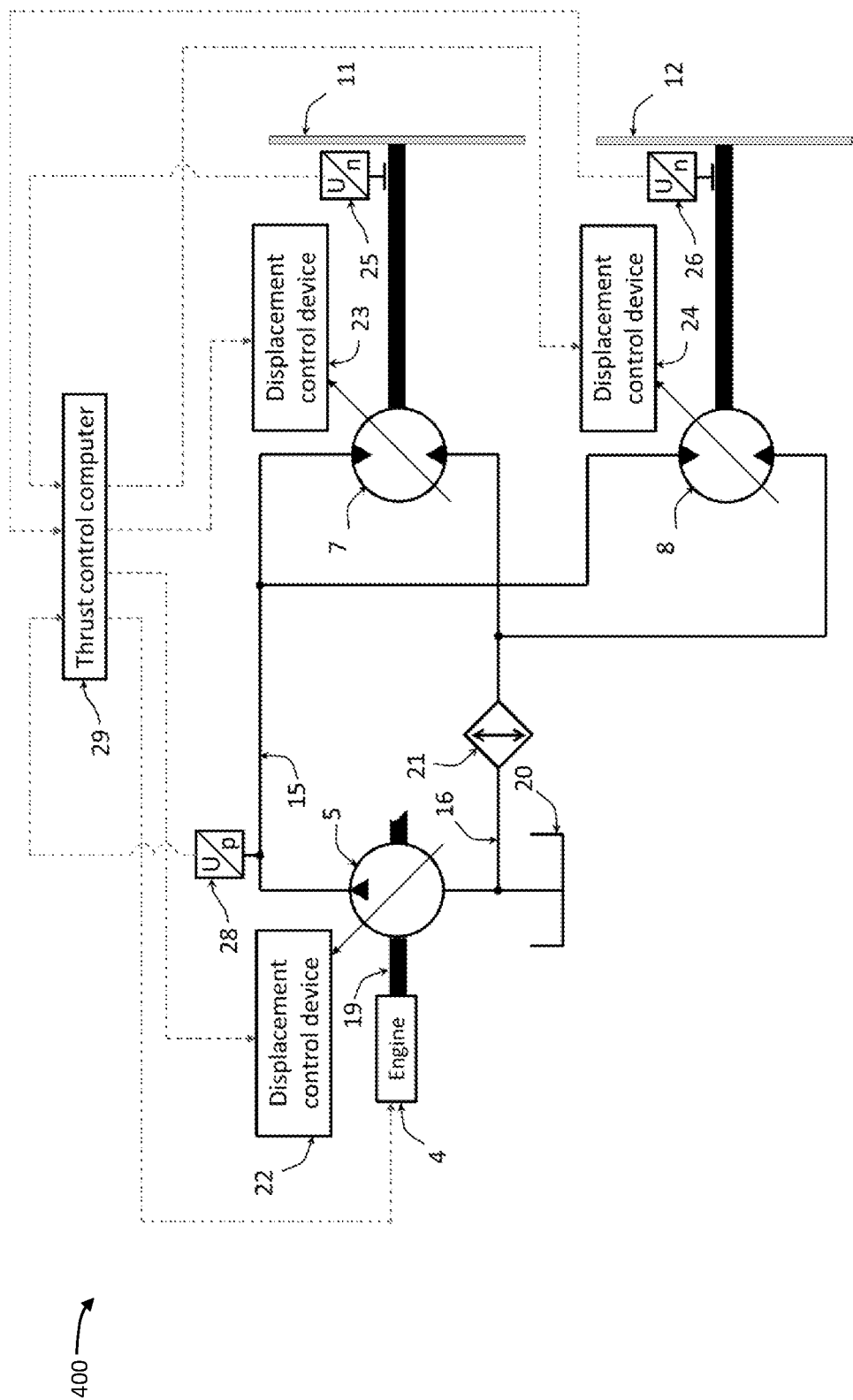
FIG. 4 is a schematic of a propulsion control system according to the present disclosure which can be used in conjunction with one or more of the embodiments disclosed herein.

With reference to FIG. 4, a partial propulsion schematic 400 of the embodiment depicted in FIG. 3 is provided in a circuit schematic form. In FIG. 4, only two motors 7, 8 coupled to two rotors 11, 12 are shown, while it should be appreciated that motors 9, 10 being coupled to rotors 13, 14 are not shown to avoid overcrowding of the figure. Consequently, the description provided below similarly applies to the motors 9, 10 and rotors 13, 14. This embodiment includes a thrust control computer 29 that controls the speed of the aerodynamic rotors 11, 12 by controlling the displacement of the hydraulic motors 7, 8 based on the system pressure. The thrust control computer 29 can also be used to set different system pressure levels or control the system pressure utilizing a closed loop pressure control. The embodiment shown in FIG. 4 also includes a displacement control device 22, adaptable to control the system pressure through control of the displacement of the hydraulic pump 5. The displacement control devices 23, and 24 are used to control the displacement of the hydraulic motors 7, 8, as described above, according to command signal from the thrust control computer 29, as shown in FIG. 4. Speed sensors 25, 26 are shown in FIG. 4 which are used to provide signals corresponding to speed of rotors 11 and 12, as feedback signals to the closed loop speed control of the hydraulic motors 7, 8. Similarly, a pressure sensor 28 is used to measure the pressure of the high-pressure line coupled to the pump 5 and to provide a feedback pressure signal to the thrust control computer 29. The embodiment shown in FIG. 4 also includes a cooling device 21 for cooling the hydraulic fluid as well as a reservoir 20 in fluid communication with the low-pressure side of the system. The reservoir 20 can be a pressurized tank, bootstrap reservoir, or a low-pressure hydro-pneumatic accumulator.

Figure 5:
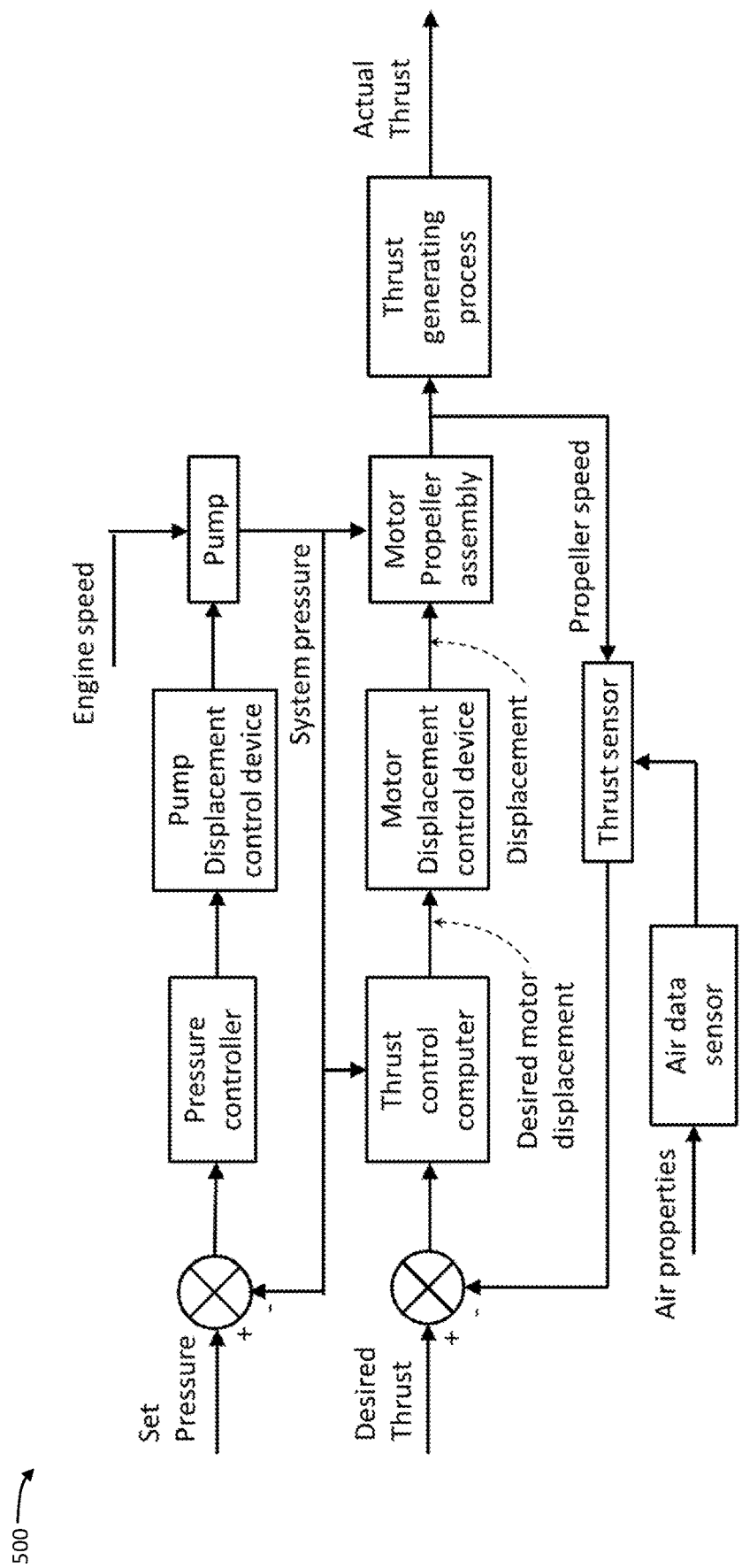
FIG. 5 is a control block diagram according to the present disclosure which can be used in conjunction with one or more of the embodiments disclosed herein.

Referring to FIG. 5, a control scheme 500 for the propulsion schematic 400 of the present disclosure shown in FIG. 4 is provided. In the control scheme, a set pressure is provided from a thrust control computer or from a pilot as input via a selectable pressure regulator. In addition, the desired thrust for each motor 7, 8, 9, 10 is also provided as an input. The input pressure is mathematically combined with the system pressure obtained via the pressure sensor 28. The mathematical combination is provided to a pressure controller (not shown in FIG. 4, but can be part of the thrust control computer or as a separate controller) which can provide a variable signal to the pump displacement control device (e.g., the device controlling the angle of the swash plate described above) for each of the pumps 5, 6. The displacement control devices control the respective pumps 5, 6 to generate the system pressure for the entire system or for each bank coupled to the respective pumps 5, 6 based on the position and setting on the pump displacement control device and the engine speed.

At the same time, the desired thrust is mathematically combined with the output of the thrust sensor receiving its input as propeller/rotor speed. The mathematical combination is provided to the thrust control computer as input which generates desired motor displacement as its output to be used as input to the motor displacement control device (e.g., the device controlling the angle of the swash plate described above) for each of the motors 7, 8, 9, 10. The motor displacement control devices generate desired displacement as their output for each of the motors to be used as input for each of the motors 7, 8, 9, 10. With each of the motors 7, 8, 9, 10 set to a desired output, the rotor/propeller speed is provided to the a thrust sensor which measures the output thrust from the motors 7, 8, 9, 10 and provides its signal to be mathematically added to the desired thrust. The trust sensor also uses air data sensor which uses air properties such as wind, temperature, etc. as input to generate air variables for the thrust sensor. The output of the motors 7, 8, 9, 10 generate actual thrust for the aircraft.

The aviation hydraulic propulsion system of the present disclosure can be used to power fixed wing aircraft, rotorcraft and any other aircraft type that combines the fixed wing aircraft and rotorcraft. For both types of aircraft, the hydraulic propulsion system offers a better opportunity for engine speed management, thrust control, and thrust vectoring than mechanical drive such as a gearbox. In the multi-rotor case, the differential thrust can be used as the aircraft's primary control for single axis such as a yaw axis of rudderless fixed-wing aircraft or multiple axes such as pitch, roll, and yaw axis of the multi-rotor vertical takeoff and landing (VTOL) aircraft. Comparing to the electric hybrid propulsion system, the hydraulic system is lighter due to the higher power density of hydraulic units. Also, due to the nature of the variable displacement hydraulic units, the operator can manually control the displacement, resulting in the thrust of the propulsion system. This human-in-the-loop redundant thrust control system increases the overall safety of the hydraulic hybrid aircraft, especially the aircraft that use differential thrust as the aircraft attitude control. The additional accumulators in the aviation hydraulic propulsion system utilizing secondary controlled drives selectively provide extra power to the system for short periods of time (duration depends on the size of the accumulator). For aircrafts that only need maximum power for a short period of time in the entire flight, such as fixed wing aircraft need maximum power only in takeoff and go-around phases, the accumulators enable engine downsizing, and therefore, better overall efficiency. The capability of thrust vectoring allows the fixed wing aircraft powered by the aviation hydraulic propulsion system utilizing secondary controlled drives convert to a vertical takeoff and landing aircraft while flying by continuously adjusting the arrangement of the motor and rotor assembly from horizontal position to vertical position, or vice versa.

The propulsion system utilizing secondary controlled drives of the present disclosure is configured to control the speed of each individual rotor with faster response and lower weight in comparison with prior art propulsion system counterpart owing to the bandwidth of the displacement control and the compactness of hydraulic units. As a result, a more stable flight and more useful payload capability can be achieved. The reliability of the aircraft increases due to the highly reliable nature of hydraulic systems. Furthermore, the aircraft power source (e.g., internal combustion engine) can be arranged to run at an optimized speed, which extends the lifetime of such power source. Furthermore, since hydraulic components are made of metal, the propulsion system of the present disclosure can be made with less cost and is further readily recyclable.

Those having ordinary skill in the art will recognize that numerous modifications can be made to the specific implementations described above. The implementations should not be limited to the particular limitations described. Other implementations may be possible.

The invention claimed is:

1. A hydraulic propulsion system, comprising:
    an input interface configured to receive mechanical power from a power source;
    a pressure source comprising one or more fixed or variable displacement pumps coupled to the input interface and adaptable to convert mechanical power to hydraulic power and controlling outlet pressure of the pressure source (system pressure);
    one or more variable displacement motors coupled to the pressure source via a corresponding hydraulic line having a fluid therein the one or more variable displacement motors configured to be mechanically coupled to one or more aerodynamic rotors of an aircraft and comprising a closed loop speed control arrangement having one or more speed sensors in response to a commanded rotor speed; and
    a controller configured to control the speed of the one or more variable displacement motors by providing a control signal for controlling the system pressure,
    the controller further configured to receive signals corresponding to attitude and one or more of position and motion of the aircraft and to generate system pressure using a feedback control system strategy which includes a pressure sensor adapted to adjust fluid pressure in the hydraulic propulsion system, the feedback control system strategy configured to adjust the system pressure based on a desired attitude representing a first system pressure provided as a first pressure sensor reading and a corresponding actual attitude representing a second system pressure provided as a second pressure sensor reading.

2. The system of claim 1, wherein the power source is one or more internal combustion engines.

3. The system of claim 1, wherein the power source is one or more electric motors.

4. The system of claim 1, wherein the power source is one or more turbine engines.

5. The system of claim 1, wherein the system pressure is set using one of an associated electro-hydraulic displacement control device, hydro-mechanical displacement control device, electro-mechanical displacement control device, and a combination thereof.

6. The system of claim 1, wherein the speed of the variable displacement motors is controlled by a closed loop speed control utilizing a speed sensing device for measuring rotor speed and one of an associated electro-hydraulic displacement control device, mechanical displacement control device, electro-mechanical displacement control device, and a combination thereof.

7. The system of claim 1, wherein a system pressure command for the system pressure of the pressure source is generated by one of a flight thrust control computer, a pilot, and a combination thereof.

8. The system of claim 1, wherein the commanded rotor speed is provided by one of a thrust control computer, a pilot, and a combination thereof.

9. The system of claim 1, further comprising a fluid cooling device adapted to cool fluid used therein.

10. The system of claim 1, the controller further configured to receive a signal corresponding to the speed of each motor and to provide the speed information as speed feedback signals to the thrust control computer.

11. The system of claim 10, further comprising a closed-loop control arrangement using the speed feedback signals.

12. The system of claim 10, further configured to receive a signal corresponding to the displacement of each motor and to provide the displacement information as displacement feedback signals to the thrust control computer.

13. The system of claim 12, further comprising a closed-loop control arrangement using the displacement feedback signals.

14. The system of claim 1, wherein the one or more fixed or variable displacement pumps are coupled to each other in series manner, whereby flow of fluid through each of the pumps is substantially equal and whereby pressure across each of the pumps is additive to establish the system pressure.

15. The system of claim 1, wherein the variable displacement pumps are coupled in pairs in a parallel manner, whereby pressure across each of the pumps is substantially the same, and fluid flow through the pumps is additive.

16. The system of claim 14, wherein each pump is coupled to a dedicated power source.

17. The system of claim 14, wherein each pump is coupled to the one or more input interfaces.

18. The system of claim 17, wherein the one or more input interfaces is a gearbox.

19. The system of claim 1, wherein the fluid is acted upon by a compressible fluid.

20. The system of claim 19, wherein the compressible fluid is air.

21. The system of claim 1, wherein the fluid is an incompressible fluid.

22. The system of claim 21, wherein the incompressible fluid is one of hydraulic oil, water, fuel, antifreeze, and a combination thereof.

\* \* \* \* \*